UNITED STATES PATENT OFFICE.

LEO HABER, OF BROOKLYN, NEW YORK.

COMPOSITION OF MATTER.

1,281,156.  Specification of Letters Patent.  Patented Oct. 8, 1918.

No Drawing.  Application filed May 17, 1916.  Serial No. 98,063.

*To all whom it may concern:*

Be it known that I, LEO HABER, a citizen of the United States, residing at New York, in the borough of Brooklyn, in the county of Kings and State of New York, have invented a new and useful Composition of Matter to be Used as a Paint and Varnish Remover from Any Surface and a Process for Preparing the Same, of which the following is a specification.

My composition consists of the following ingredients, combined in the proportions stated, viz:

| | |
|---|---|
| Paraffin | 8% |
| Alcohol | 14% |
| Water | 20% |
| Sal-soda | 30% |
| Benzol | 28% |
| | 100% |

It will be found that the best results are obtained by using the proportions indicated, but they may be varied somewhat without materially affecting the usefulness of my preparation.

A composition for removing coats of paint or varnish from any surface should contain an energetic softening or loosening agent, and should remove the paint thus softened from the surface without injury to the latter. It should also leave the surface thoroughly cleaned. Another essential requirement is that it should not generate poisonous or obnoxious gases and should not injure the hands of the person applying same.

It is well known to the art that paints are made of quite a variety of compositions. It is therefore evident that, in order to be effective, a paint remover should attack paints of various compositions. My preparation will satisfy the above requirements, as an analysis of the several ingredients will show. For example, sal-soda when used alone will attack some paints but is not effective on a good many others, particularly hard varnish or very old paint. Alcohol will readily attack the spirit varnishes, but is of little effect on other varieties of paints. Benzol will gelatinize most of the paints but will not remove them from the surface. Benzol and alcohol if used without the other ingredients are found to be objectionable on account of the fumes generated and the large quantity of alcohol required to carry away the dissolved paint. By adding sal-soda and paraffin to the last two mentioned ingredients, a composition is obtained which will not generate fumes and will readily remove all kinds of paints from any surface in a very short time. Due to the combined action of the benzol and alcohol, the paint is softened and left in a gelatinized state, while the sal-soda separates the gelatinized paint from the surface, forming a paste which can be readily washed off with water. The function of the paraffin is to prevent the evaporation of the alcohol and benzol and to serve as a lubricant.

Instead of paraffin any other wax composition may be used giving satisfactory results. I find, however, that paraffin will give good results and is less expensive than other wax compounds.

It will be found that by combining the various ingredients in the proportion mentioned above a very effective composition to be used as a paint remover will be obtained. This preparation will remove paint irrespective of its age, hardness or quality.

A very important feature of my composition is that water may be used to wash away the dissolved paint from the surface of the object being cleaned, thus requiring only a small quantity of the preparation for softening the paint. Another advantage of this composition is that no poisonous or obnoxious gases are produced and it will not injure the hands of a person using same.

The process of preparing this composition is as follows:

A quantity of paraffin or other wax compound is melted and then mixed with heated alcohol in the proportion of 8% to 14% (by volume), to this, and while in molten state, a hot, concentrated solution of sal-soda containing 30% of sal-soda and 20% of water (by volume) is added, to this 28% (by volume) of benzol at its boiling temperature is added, and the mixture thoroughly stirred.

The above composition can be applied to any object requiring cleansing by means of a brush or any other convenient method, such as by using a sponge or cloth. This will attack the coat of paint and dissolve it within ten or fifteen minutes, depending upon the hardness, age or composition of the paint or varnish. After the paint or varnish is well dissolved the surface should be washed off with water.

Having thus described my invention, I claim as new and wish to secure by Letters Patent:—

1. The herein-described composition of matter to be used as a paint remover, consisting of any wax compound, alcohol, water, sal-soda and benzol.

2. The herein-described composition of matter to be used as a paint remover, consisting of paraffin, alcohol, water, sal-soda and benzol.

3. The herein-described composition of matter to be used as a paint remover, consisting of paraffin 8%, alcohol 14%, water 20%, sal-soda 30% and benzol 28%.

Signed at New York, county of New York and State of New York, this 16th day of May, 1916.

LEO HABER.